US012657623B2

(12) United States Patent
Hwang et al.

(10) Patent No.: US 12,657,623 B2
(45) Date of Patent: Jun. 16, 2026

(54) DYEING ABSORBANCE SPECTRA PREDICTION APPARATUS AND METHOD FOR MIXED DYE

(71) Applicant: ELECTRONICS AND TELECOMMUNICATIONS RESEARCH INSTITUTE, Daejeon (KR)

(72) Inventors: Ji Yong Hwang, Daejeon (KR); Hyun Woo Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 189 days.

(21) Appl. No.: 18/780,811

(22) Filed: Jul. 23, 2024

(65) Prior Publication Data

US 2025/0209520 A1     Jun. 26, 2025

(30) Foreign Application Priority Data

Dec. 20, 2023     (KR) ........................ 10-2023-0187431
Mar. 12, 2024     (KR) ........................ 10-2024-0034702

(51) Int. Cl.
*G01N 21/25*        (2006.01)
*D06P 1/00*         (2006.01)
(Continued)

(52) U.S. Cl.
CPC ............ *G06Q 30/0635* (2013.01); *D06P 1/00* (2013.01); *G01J 3/42* (2013.01); *G01J 3/463* (2013.01)

(58) Field of Classification Search
CPC ...................................................... G01N 21/25
See application file for complete search history.

(56) References Cited

U.S. PATENT DOCUMENTS 4,597,670 A        7/1986  Ohashi et al.
5,255,350 A  *  10/1993  Hermann ................ B01F 33/84
                                                      358/1.9
(Continued)

FOREIGN PATENT DOCUMENTS

KR            10-0914952 B1      8/2009
KR      10-2024-0081088 A      6/2024

*Primary Examiner* — Andrew T Piziali
(74) *Attorney, Agent, or Firm* — LRK PATENT LAW FIRM

(57)                    ABSTRACT

Provided is a dyeing absorbance spectra prediction apparatus and method. The apparatus includes an input module to receive customer's order for dyeing and colorimetric reflectance data of a dyeing result, database to store absorbance data for each concentration for monochromatic dyes and dyeing absorbance data, and a processor connected to the input module and database. The processor generates the absorbance data for each concentration based on reflectance data for each concentration for the monochromatic dyes, generates the dyeing absorbance data according to concentration of each dye based on absorbance of a dye bath before and after dyeing of the monochromatic dyes, predicts a dye mixing ratio for the mixed dye to predict first spectra, predicts second spectra of the dyeing absorbance, converts the colorimetric reflectance data of the customer's order into absorbance data to implement third spectra, compares the second spectra with the third spectra, and outputs comparison result.

16 Claims, 9 Drawing Sheets

(51) Int. Cl.
    *G01J 3/42*        (2006.01)
    *G01J 3/46*        (2006.01)
    *G06Q 30/0601*    (2023.01)

(56)        References Cited

U.S. PATENT DOCUMENTS

| | | | |
|---|---|---|---|
| 10,564,037 B2 | 2/2020 | Jang et al. | |
| 2003/0223060 A1* | 12/2003 | Graf ........................ | G01J 3/504 |
| | | | 356/319 |
| 2021/0089749 A1* | 3/2021 | Amthor ................ | G06N 3/0455 |
| 2022/0391711 A1 | 12/2022 | Oh et al. | |
| 2024/0175201 A1 | 5/2024 | Hwang et al. | |

* cited by examiner

FIG. 7

DYEING ABSORBANCE SPECTRA PREDICTION APPARATUS AND METHOD FOR MIXED DYE

CROSS-REFERENCE TO RELATED APPLICATIONS

This application claims priorities to and the benefits of Korean Patent Application No. 10-2023-0187431, filed on Dec. 20, 2023 and No. 10-2024-0034702, filed on Mar. 12, 2024, the disclosure of which is incorporated herein by reference in its entirety.

BACKGROUND

1. Field of the Invention

The present invention relates to a dyeing absorbance spectra prediction apparatus and method for a mixed dye, and more specifically, to a dyeing absorbance spectra prediction apparatus and method for a mixed dye that can predict dyeing absorbance spectra of a mixed dye using a mathematical model to correct a dye mixing ratio.

2. Description of Related Art

One of the key points in the dyeing-related industry is to implement buyers' requested color using the requested fabric and requested standard light source.

Generally, a dyeing process corresponding to a buyer's order is as follows.

First, according to the buyer's order, computer color matching (CCM) colorimetric values of a CCM colorimetric system are delivered to the company or site in the form of a QuickTime extension (QTX) electronic file or a colorimetric sample. Then, at the site, a reflectance value among various pieces of information in the QTX file is used to check information about a requested color, and data on monochromatic dyes of different concentrations used at the site is used to select a dye mixing ratio by simulating monochromatic dyes selected by a worker in order to match the color requested by the buyer on the basis of the know-how of the worker. Dyeing results from each process of beaker test (B/T), first on-site dyeing, and second on-site dyeing are measured with a CCM colorimeter using the dye mixing ratio selected in this way, whether there is a color difference is checked, and when a color difference is found, the above processes are repeated.

Further, due to problems with color matching, in the process of moving from B/T to on-site dyeing, color differences may occur due to scaling up of the fabric and dye amount that is caused by differences in the type and allowable capacity (500 to 1,500 Kg) of dyeing machine.

At the site, the above processes are repeated for color matching, but since a mixing ratio of monochromatic dyes that is randomly selected based on the know-how of experienced workers is applied, not only is the reliability of results not high, but it is also difficult for new workers to perform these tasks, and thus a long time, high energy, many raw materials, and much labor are required.

Therefore, in the dyeing process that mixes monochromatic dyes and reproduces the color requested by the buyer, in order to easily reproduce the requested color, a technology in which reflectance data of the requested color measured through a colorimeter and absorbance data calculated from the reflectance data for each of the monochromatic dyes are utilized so that a mixing ratio of the monochromatic dyes is corrected and supplemented with an absorbance graph has been presented.

However, in such a technology, absorbance data calculated based on reflectance data of monochromatic dyes at 6 to 8 concentrations (0.1%, 0.5%, 1%, 3%, 5%, 8%, etc. on the weight of fiber (o.w.f)) in use at the site are used, this technology relies on simple linear interpolation to implement a mixing ratio concentration range of 4 to 5 decimal places used in real site, and thus it is not possible to present a more detailed dye mixing ratio or suggest a correction method.

Further, in the dyeing process, a dye absorbance graph based on CCM reflectance is used to correct a mixing ratio of monochromatic dyes to reproduce customers' requested color. By implementing absorbance of a monochromatic dye or a mixed dye according to a set concentration in a visible wavelength range from reflectance-based absorbance data through quantitative analysis and regression analysis, a mathematical model is used to enable implementation of the dye mixing ratio concentration range used at the site.

However, in order to apply the dye mixing ratio implemented in this way to the real site, there is a need for correction in dye prescriptions for B/T and on-site dyeing.

The related art of the present invention is disclosed in Korean Patent Registration No. 10-0914952 (Published on Aug. 31, 2009).

SUMMARY OF THE INVENTION

The present invention is directed to providing a dyeing absorbance spectra prediction apparatus and method for a mixed dye that are capable of correcting a dye mixing ratio of a requested color to reduce a color deviation.

According to an aspect of the present disclosure, there is provided a dyeing absorbance spectra prediction apparatus for a mixed dye, which includes an input module configured to receive a customer's order for dyeing and colorimetric reflectance data of a dyeing result, a database configured to store absorbance data for each concentration for monochromatic dyes and dyeing absorbance data, and a processor operatively coupled to the input module and the database, wherein the processor generates the absorbance data for each concentration on the basis of reflectance data for each concentration for the monochromatic dyes, generates dyeing absorbance data according to concentration of each dye on the basis of absorbance of a dye bath before and after dyeing of the monochromatic dyes, then predicts a dye mixing ratio for the mixed dye corresponding to a computer color matching (CCM) value of the customer's order and absorbance to predict first spectra, predicts second spectra of the dyeing absorbance with respect to the first spectra, then converts the colorimetric reflectance data of the customer's order into absorbance data to implement third spectra, compares the second spectra with the third spectra, and outputs a comparison result.

When correction of the dye mixing ratio predicted based on the comparison result obtained by comparing the second spectra with the third spectra and replacement of the monochromatic dye are performed, the processor may re-predict the second spectra and compare the re-predicted second spectra with the third spectra.

The processor may calculate an absorption rate (or absorbance) for each of the monochromatic dyes at each concentration from reflectance described in a QuickTime extension (QTX) file, which is a CCM colorimetry result for each of the monochromatic dyes at each concentration used in a real dyeing factory, to generate the absorbance data for each concentration in a wavelength range corresponding to visible light.

The processor may check values of color coordinates X, Y, and Z in the QTX file of the customer's order with a CCM system, select the monochromatic dyes that are held by a dyeing factory and used for yarn production, and then predict the dye mixing ratio for the mixed dye by calculating a deviation of the values of the color coordinates X, Y, and Z, which is basic data, and performing a simulation.

The processor may generate a first mathematical model for each monochromatic dye by combining absorbance prediction functions at each wavelength for a monochromatic dye, a wavelength range, and a concentration that are set by a worker in a dyeing factory through regression analysis, and implement the absorbance data for each concentration for the monochromatic dyes through the first mathematical model.

The processor may perform quantitative analysis to check a change in value of each of the color coordinates X, Y, and Z according to a change in dye concentration for each monochromatic dye using values of color coordinates X, Y, and Z in a standard light source of a CCM colorimetric QTX file that is set by the worker, combine functions, fx, fy, and fz, in which the values of color coordinates X, Y, and Z for each monochromatic dye according to an arbitrary concentration are allowed to be predicted through regression analysis of the changes in the values of color coordinates X, Y, and Z, and generate the first mathematical model through which a color of a dyeing result corresponding to the standard light source and a concentration of the monochromatic dye that are set by the worker in the dyeing factory are allowed to be predicted.

The processor may generate a second mathematical model for each monochromatic dye by combining dyeing absorbance prediction functions in a set wavelength range of the monochromatic dye that is set by a worker in a dyeing factory, and predict the second spectra of dyeing absorbance with respect to the first spectra through the second mathematical model.

The processor may calculate a predicted dyeing absorbance for each monochromatic dye on the basis of the dyeing absorbance data according to the concentration of each dye, and perform quantitative analysis and regression analysis on pre-dyeing absorbance data and the predicted dyeing absorbance data to generate the second mathematical model that is allowed to implement absorbance in the set wavelength range.

According to another aspect of the present disclosure, there is provided a dyeing absorbance spectra prediction method for a mixed dye, which includes generating, by a processor, absorbance data for each concentration on the basis of reflectance data for each concentration for monochromatic dyes, generating, by the processor, dyeing absorbance data according to concentration of each dye on the basis of absorbance of a dye bath before and after dyeing of the monochromatic dyes, predicting, by the processor, a dye mixing ratio for the mixed dye corresponding to a CCM value of a customer's order and the absorbance and predicting first spectra, predicting, by the processor, second spectra of dyeing absorbance with respect to the first spectra, converting, by the processor, colorimetric reflectance data of the customer's order into absorbance data and implementing third spectra, and comparing, by the processor, the second spectra with the third spectra and outputting a comparison result.

The dyeing absorbance spectra prediction method may further include, when correction of the dye mixing ratio predicted based on the comparison result obtained by comparing the second spectra with the third spectra and replacement of the monochromatic dye are performed, re-predicting, by the processor, the second spectra and comparing the re-predicted second spectra with the third spectra.

In the generating of the absorbance data for each concentration, the processor may calculate an absorption rate (or absorbance) for each of the monochromatic dyes at each concentration from reflectance described in a QTX file, which is a CCM colorimetry result for each of the monochromatic dyes at each concentration used in a real dyeing factory, to generate the absorbance data for each concentration in a wavelength range corresponding to visible light.

In the predicting of the first spectra, the processor may check values of color coordinates X, Y, and Z in the QTX file of the customer's order with a CCM system, select the monochromatic dyes that are held by a dyeing factory and used for yarn production, and then predict the dye mixing ratio for the mixed dye by calculating a deviation of the values of the color coordinates X, Y, and Z, which is basic data, and performing a simulation.

In the predicting of the first spectra, the processor may generates a first mathematical model for each monochromatic dye by combining absorbance prediction functions at each wavelength for a monochromatic dye, a wavelength range, and a concentration that are set by a worker in a dyeing factory through regression analysis, and implement the absorbance data for each concentration for the monochromatic dyes through the first mathematical model.

In the predicting of the first spectra, the processor may perform quantitative analysis to check a change in value of each of the color coordinates X, Y, and Z according to a change in dye concentration for each monochromatic dye using values of color coordinates X, Y, and Z in a standard light source of a CCM colorimetric QTX file that is set by the worker, combine functions, fx, fy, and fz, in which the values of color coordinates X, Y, and Z for each monochromatic dye according to an arbitrary concentration are allowed to be predicted through regression analysis of the changes in the values of color coordinates X, Y, and Z, and generate the first mathematical model through which a color of a dyeing result corresponding to the standard light source and a concentration of the monochromatic dye that are set by the worker in the dyeing factory are allowed to be predicted.

In the predicting of the second spectra, the processor may generate a second mathematical model for each monochromatic dye by combining dyeing absorbance prediction functions in a set wavelength range of the monochromatic dye that is set by a worker in a dyeing factory, and predict the second spectra of dyeing absorbance with respect to the first spectra through the second mathematical model.

In the predicting of the second spectra, the processor may calculate a predicted dyeing absorbance for each monochromatic dye on the basis of the dyeing absorbance data according to the concentration of each dye, and perform quantitative analysis and regression analysis on pre-dyeing absorbance data and the predicted dyeing absorbance data to generate the second mathematical model that is allowed to implement absorbance in the set wavelength range.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 7 is a set of exemplary graphs for describing a mathematical model for implementing and predicting dyeing absorbance according to the present embodiment;

DETAILED DESCRIPTION OF EXEMPLARY EMBODIMENTS

Figure 1:
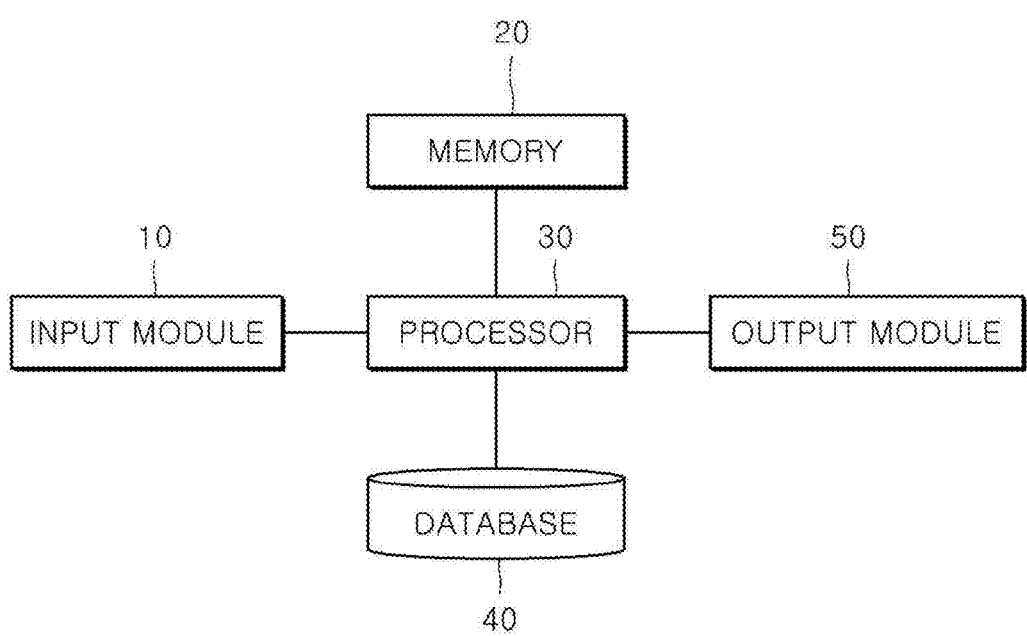
FIG. 1 is a block diagram illustrating a dyeing absorbance spectra prediction apparatus for a mixed dye according to an embodiment of the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, a dyeing absorbance spectra prediction apparatus and method for a mixed dye according to the present invention will be described with reference to the accompanying drawings.

Figure 2:
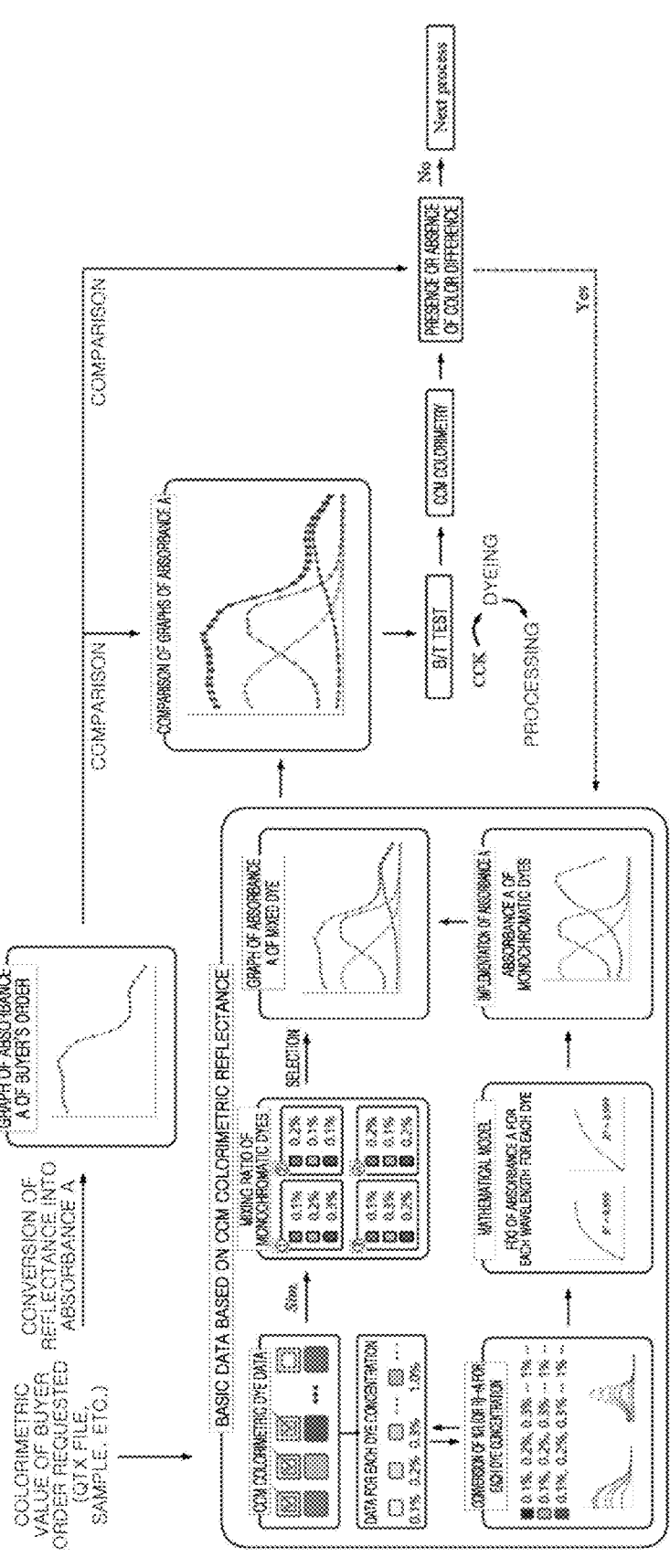
FIG. 2 is an exemplary diagram showing an on-site dyeing process to which the dyeing absorbance spectra prediction apparatus for the mixed dye according to an embodiment of the present invention is applied.

FIG. 1 is a block diagram illustrating a dyeing absorbance spectra prediction apparatus for a mixed dye according to an embodiment of the present invention, and FIG. 2 is an exemplary diagram showing an on-site dyeing process to which the dyeing absorbance spectra prediction apparatus for the mixed dye according to an embodiment of the present invention is applied.

Referring to FIG. 1, the dyeing absorbance spectra prediction apparatus for the mixed dye according to the embodiment of the present invention may include an input module 10, a memory 20, a processor 30, an output module 50, and a database 40.

The input module 10 may receive a customer's order (e.g., fabric texture, a yarn count, a fabric component mixing ratio, and color red-green-blue (RGB) values). In this case, the customer's order may be received with a QuickTime extension (QTX) file. The input module 10 may be, for example, an interface (e.g., a keyboard, a touch screen, a Universal Serial Bus (USB), etc.) for data (information) input, and in some embodiments, may receive data through communication.

Further, the input module 10 may receive colorimetric reflectance data of a dyeing result measured through a colorimeter and absorbance measured through a spectrophotometer during a dyeing process.

Executable programs and various types of information that are required in the process of operating the processor 30 may be stored in the memory 20. Further, various types of information calculated in the process of operating the processor 30 may be stored in the memory 20. The memory 20 may include a read-only memory (ROM), a random access memory (RAM), a flash memory, a memory card, a storage medium, and/or other storage devices.

Basic data, such as dye data obtained at the site (or dyeing factory), absorbance data for each concentration for monochromatic dyes and dyeing absorbance data that are processed by the processor 30, and the like, may be stored in the database 40.

The output module 50 may output results of the operations performed by the processor 30 through an output device (e.g., a monitor).

The processor 30 may be operatively coupled to the input module 10, the memory 20, the database 40, and the output module 50 and perform various operations by copying various types of programs stored in the memory 20 to a RAM and executing the programs in order to control the overall operation of the dyeing absorbance spectra prediction apparatus for the mixed dye.

As shown in FIG. 2, the processor 30 generates the absorbance data for each concentration on the basis of reflectance data by computer color matching (CCM) colorimetric concentration for the monochromatic dyes, generates the dyeing absorbance data according to the concentration of each dye on the basis of absorbance of a dye bath before and after dyeing of the monochromatic dyes, and stores the generated data in the database 40.

Further, the processor 30 may predict a dye mixing ratio for the mixed dye corresponding to the CCM value of the customer's order input from the input module 10 to predict first spectra, predict second spectra of the dyeing absorbance with respect to the first spectra, then convert the colorimetric reflectance data of the customer's order into absorbance data to implement third spectra, compare the second spectra with the third spectra, and output a result of the comparison through the output module 50.

Thereafter, when correction of the dye mixing ratio predicted based on the result of comparing the second spectra with the third spectra and replacement of the monochromatic dye are performed, the processor 30 may repeat the process of re-predicting the second spectra and comparing the re-predicted second spectra with the third spectra.

Figure 3:
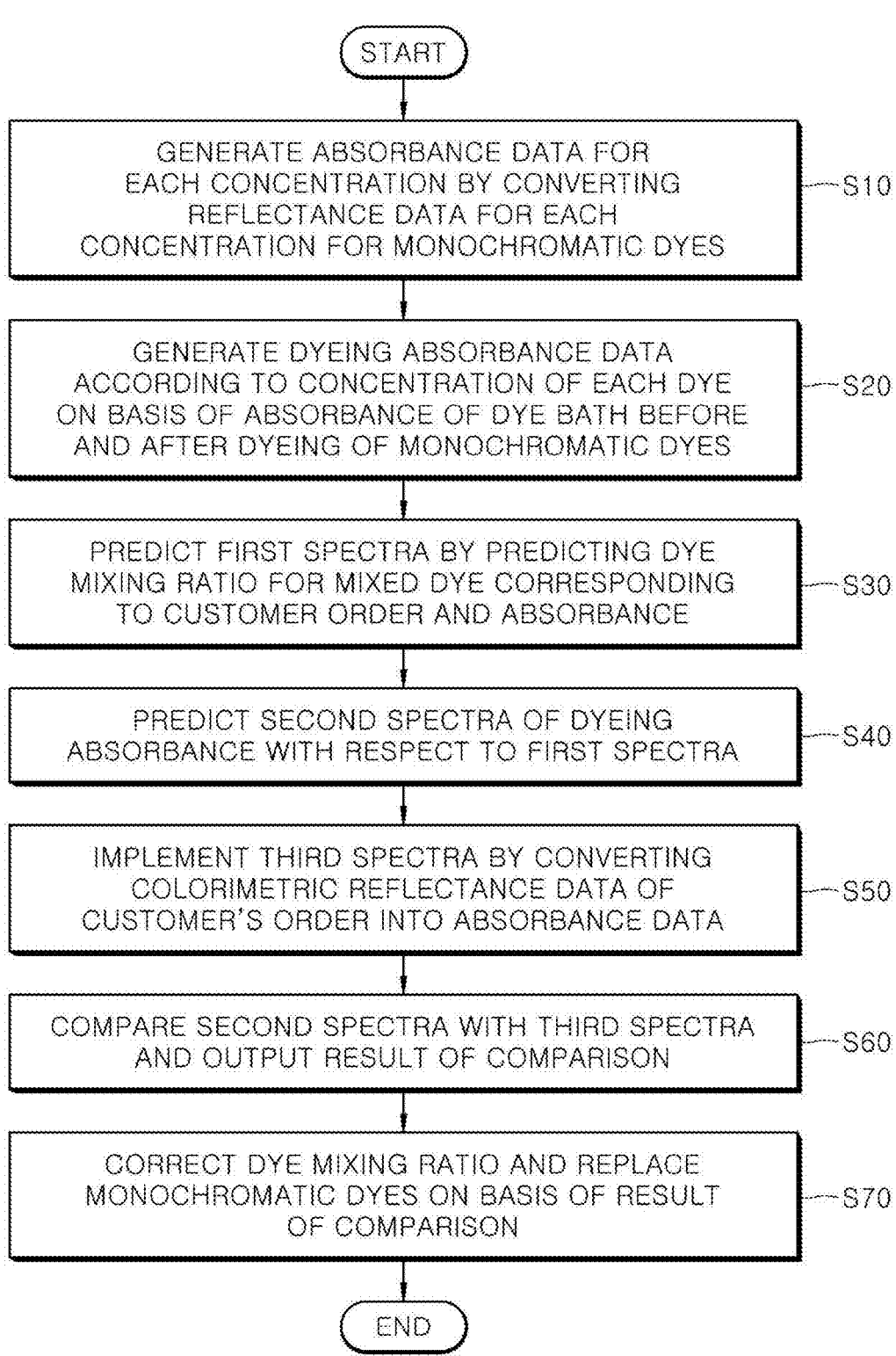
FIG. 3 is a flowchart for describing a dyeing absorbance spectra prediction method for a mixed dye according to an embodiment of the present invention.
Figure 4:
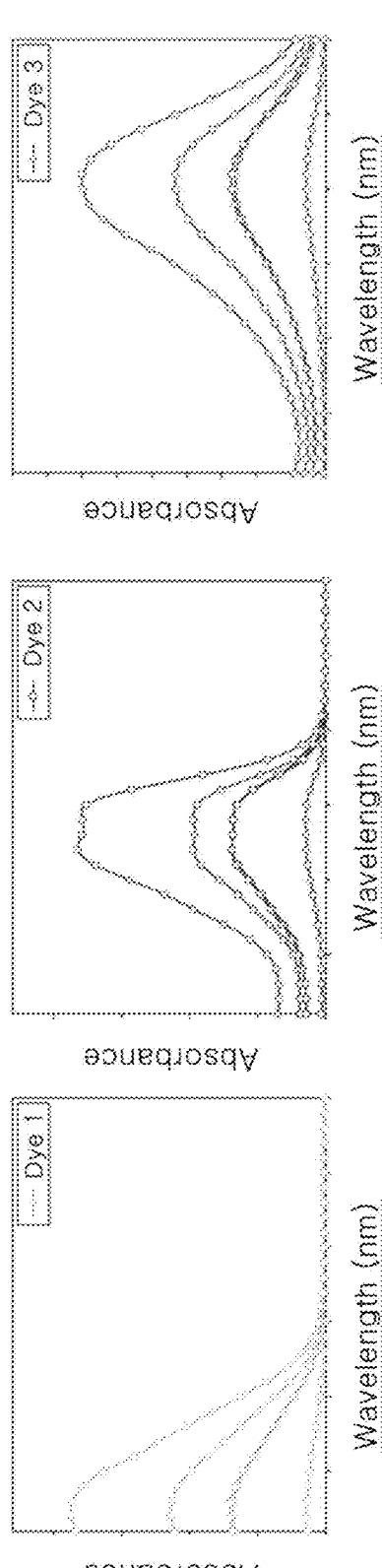
FIG. 4 is a set of exemplary graphs showing results of measuring absorbance for each of monochromatic dyes at each concentration using a spectrophotometer.
Figure 5:
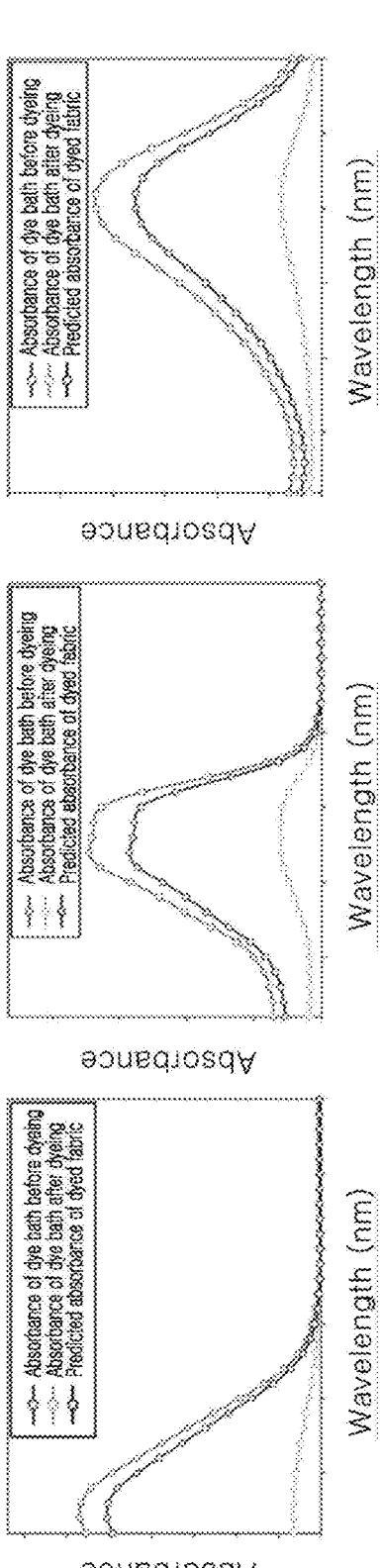
FIG. 5 is a set of exemplary graphs showing absorbance spectra measured after a dilution process performed before and after dyeing is performed when dyeing is performed on a monochromatic dye in a dyeing process.
Figure 6:
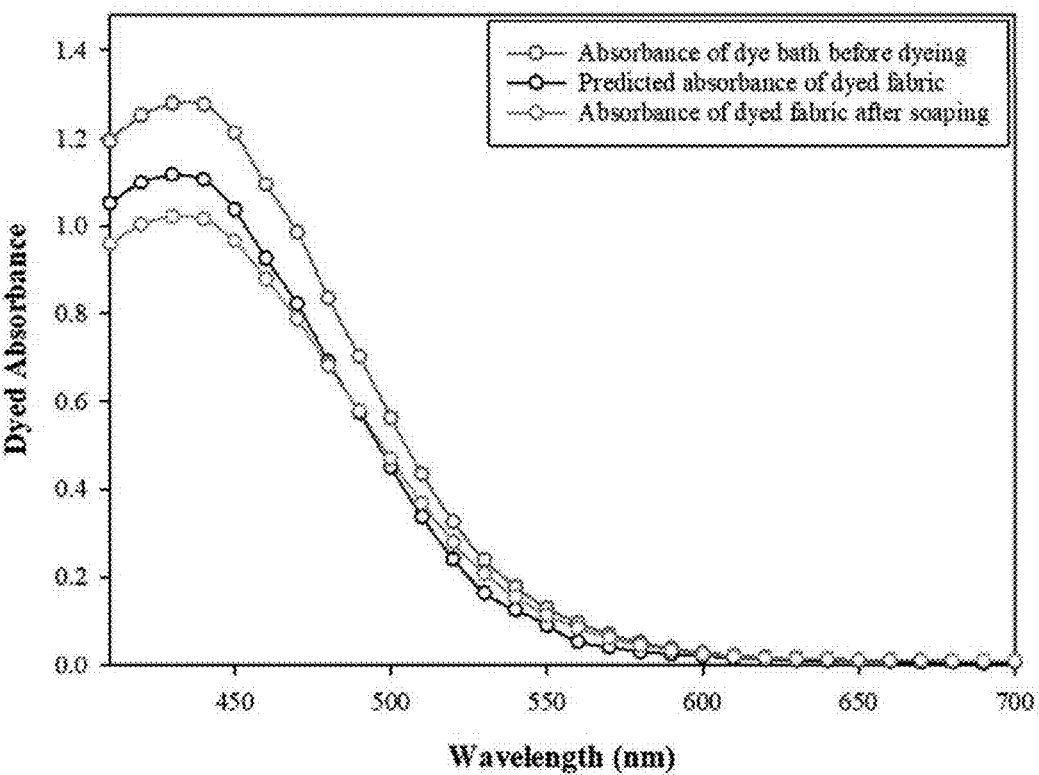
FIG. 6 is an exemplary graph showing spectra before dyeing, predicted dyeing absorbance spectra after dyeing, and spectra after soaping, in a dyeing process.
Figure 7:
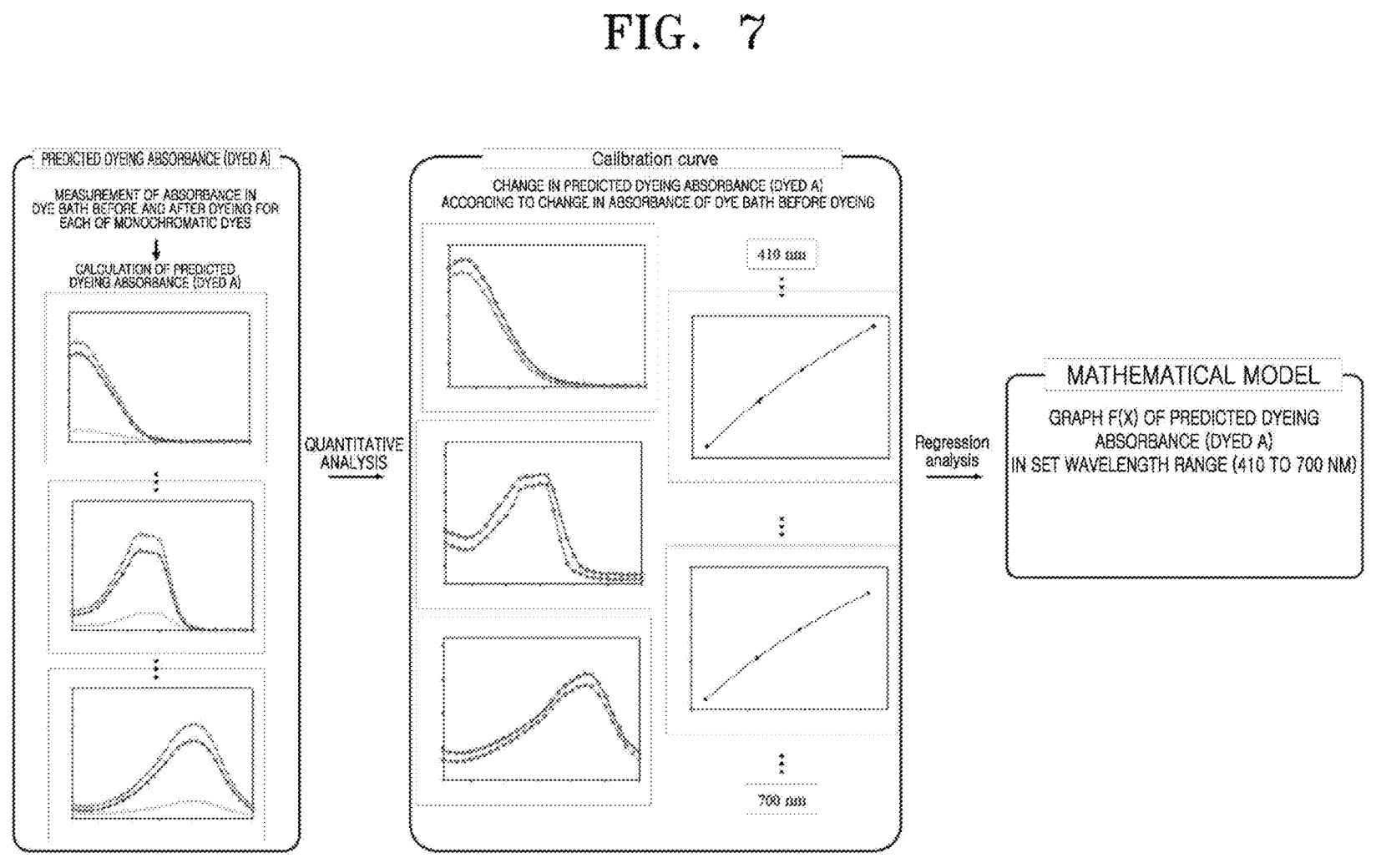
Figure 8:
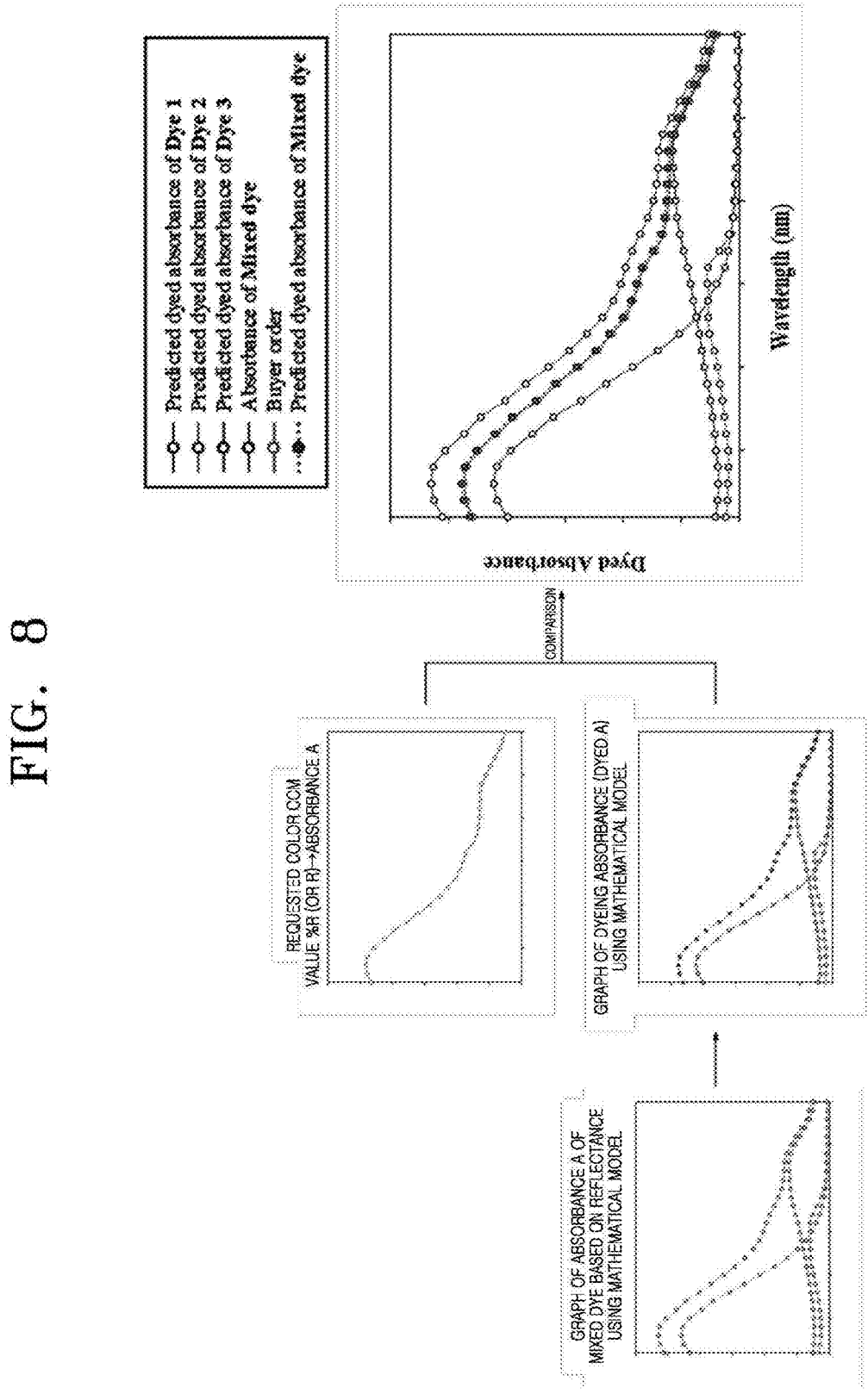
FIG. 8 is a set of exemplary graphs for describing a process of predicting a dye mixing ratio for a mixed dye corresponding to a computer color matching (CCM) value of a customer's order according to the present embodiment.
Figure 9:
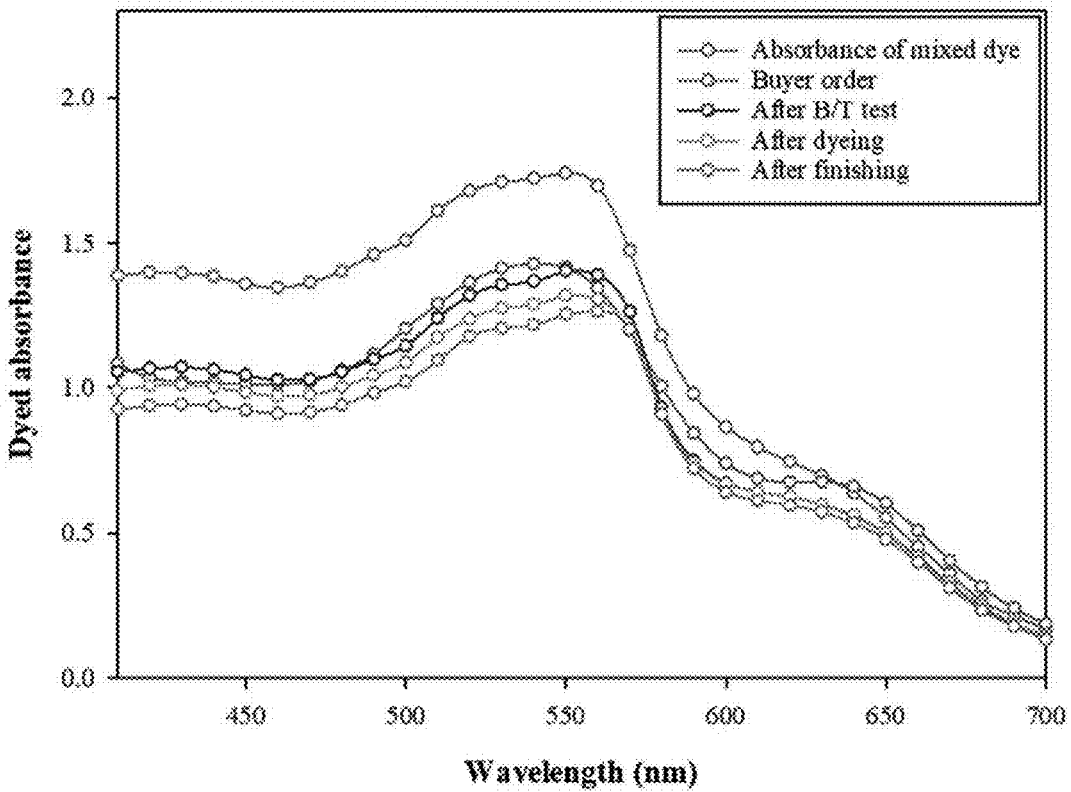
FIG. 9 is an exemplary graph showing dyeing absorbance spectra of the mixed dye in the overall dyeing process according to the present embodiment.

FIG. 3 is a flowchart for describing a dyeing absorbance spectra prediction method for a mixed dye according to an embodiment of the present invention, FIG. 4 is a set of exemplary graphs showing results of measuring absorbance for each of monochromatic dyes at each concentration using a spectrophotometer, FIG. 5 is a set of exemplary graphs showing absorbance spectra measured after a dilution process performed before and after dyeing is performed when dyeing is performed on a monochromatic dye in a dyeing process, FIG. 6 is an exemplary graph showing spectra before dyeing, predicted dyeing absorbance spectra after dyeing, and spectra after soaping, in a dyeing process, FIG. 7 is a set of exemplary graphs for describing a mathematical model for implementing and predicting dyeing absorbance according to the present embodiment, FIG. 8 is a set of exemplary graphs for describing a process of predicting a dye mixing ratio for a mixed dye corresponding to a CCM value of a customer's order according to the present embodiment, and FIG. 9 is an exemplary graph showing dyeing absorbance spectra of the mixed dye in the overall dyeing process according to the present embodiment.

Referring to FIG. 3, in the dyeing absorbance spectra prediction method for the mixed dye according to the embodiment of the present invention, the processor 30 generates absorbance data for each concentration on the basis of reflectance data for each concentration for the monochromatic dyes and stores the absorbance data for each concentration in the database 40 (S10).

The processor 30 may calculate an absorption rate (or absorbance) for each of the monochromatic dyes at each concentration according to the reflectance data (i.e., reflectance data in the QTX file, which is a result of CCM colorimetry for each concentration of monochromatic dyes) of the monochromatic dyes held and used in a real dyeing factory, and generate the absorbance data for each concentration in a wavelength range corresponding to visible light.

Referring to FIG. 4, results of measuring absorbance for each concentration using a UV-Vis spectrophotometer by randomly selecting three colors of monochromatic dyes from among the dyes in use at the site are shown. Here, a measurement range of the wavelength is set at 410 to 700 nm in consideration of the wavelength range of the reflectance data obtained from the colorimetric value. A mathematical model is generated through quantitative analysis and regression analysis on the basis of the results of measuring the absorbance according to the concentration of the monochromatic dyes so that the absorbance data is generated and the absorbance data is stored in the database 40.

Further, the processor 30 generates dyeing absorbance data according to the concentration of each dye on the basis of absorbance of a dye bath before and after dyeing of the monochromatic dyes and stores the generated dyeing absorbance data in the database 40 (S20).

Referring to FIG. 5, when three dyes in FIG. 4 are each dyed into a fabric as monochromatic dyes, differences are expressed as absorbance spectra by comparing the absorbance of the dye bath before and after dyeing with the absorbance measured after the dilution process in the same manner. The absorbance, which represents a difference between absorbance before and after dyeing, may be referred to as an amount of dye lost in the dye bath before dyeing, and may be referred to as an amount of dye dyed, fixed, and temporarily dyed on the dyed fabric.

Further, FIG. 6 shows spectra before dyeing, predicted dyeing absorbance spectra after dyeing, and dyeing absorbance spectra after soaping that are obtained after resetting a different amount of dye. In the case of on-site dyeing, dyeing and soaping are performed simultaneously in one dyeing machine, but a separate soaping process may be required in the laboratory-level beaker test (B/T) stage. Therefore, for the dyeing absorbance spectra after soaping, soaping may be performed to remove the dye temporarily dyed on the fabric, then the dyed fabric may be measured with a colorimeter, and the reflectance may be converted into the absorbance data. Through this method, it is also possible to check dyeing absorbance after dyeing and soaping.

Thereafter, the processor 30 predicts a dye mixing ratio for the mixed dye corresponding to a CCM value of the customer's order to predict the first spectra (S30).

The processor 30 may check values of color coordinates X, Y, and Z in a QTX file of the customer's order with a CCM system, select monochromatic dyes that are held in a dyeing factory and used for yarn production, and then predict the dye mixing ratio for the mixed dye by calculating a deviation of the values of the color coordinates X, Y, and Z, which is basic data, and performing a simulation.

In this case, the processor 30 may generate a first mathematical model for each monochromatic dye by combining absorbance prediction functions at each wavelength for a monochromatic dye, a wavelength range, and a concentration that are set by a worker in a dyeing factory through regression analysis, and implement the absorbance data for each concentration for the monochromatic dyes through the first mathematical model.

Here, the processor 30 may perform quantitative analysis to check changes in values of color coordinates X, Y, and Z according to a change in value of each of the color coordinates X, Y, and Z according to a change in dye concentration for each monochromatic dye using values of color coordinates X, Y, and Z in a standard light source of a CCM colorimetric QTX file that is set by the worker, combine functions, fx, fy, and fz, in which the values of color coordinates X, Y, and Z for each monochromatic dye according to an arbitrary concentration are allowed to be predicted through regression analysis of the changes in the values of color coordinates X, Y, and Z, and generate the first mathematical model through which a color of a dyeing result corresponding to the standard light source and a concentration of the monochromatic dye that are set by the worker in the dyeing factory are allowed to be predicted.

Therefore, the processor 30 may use absorbance data based on a first mathematical model of monochromatic dyes that are held in the dyeing factory and used for yarn production to implement absorbance data for each concentration for monochromatic dyes of various colors and predict absorbance data of a mixed dye generated by mixing the monochromatic dyes.

The processor 30 predicts a dye mixing ratio for the mixed dye in this way to predict first spectra, and then predicts second spectra of dyeing absorbance with respect to the first spectra (S40).

In this case, the processor 30 may predict the dyeing absorbance for each of the monochromatic dyes on the basis of the dyeing absorbance data according to the concentration of each dye stored in the database 40, perform quantitative analysis and regression analysis on the predicted dyeing absorbance data, generate a second mathematical model that is allowed to implement absorbance within the set wavelength range, and implement the predicted dyeing absorbance spectra corresponding to an arbitrary concentration of the dye bath before dyeing.

Referring to FIG. 7, the processor 30 dilutes the dye bath before and after dyeing for each of the monochromatic dyes at a certain ratio at various concentrations, then measures the absorbance with a spectrophotometer, receives the measured absorbance, and calculates the dyeing absorbance (dyed A) predicted as the difference in absorbance before and after dyeing.

The processor 30 may calculate the predicted dyeing absorbance for each of the monochromatic dyes on the basis of the dyeing absorbance data according to the concentration of each dye, then perform quantitative analysis (calibration curve) and regression analysis on the pre-dyeing the absorbance data and the predicted dyeing absorbance data, generate the second mathematical model that can implement the absorbance within a visible light wavelength range of 400 to 700 nm, and implement the predicted dyeing absorbance spectra corresponding to an arbitrary concentration of the dye bath before dyeing.

Thereafter, the processor 30 converts the colorimetric reflectance data of the customer's order into the absorbance data to implement third spectra (S50).

It is assumed that a QTX file, a color chip, a swatch sample, etc. of the customer's order are received and a QTX file colorized with a CCM colorimeter is secured on site. The content of the QTX file includes a light source and a color of requested fabric that are requested by the customer.

Therefore, reflectance data in the QTX file may be converted into data on absorbance A, and the data of the absorbance A is a value converted based on customer requirements.

The processor 30 implements the third spectra, then compares the second spectra with the third spectra, and outputs a result of the comparison (S60).

Referring to FIG. 8, absorbance data, which is implemented for implementation of absorbance spectra of monochromatic dye and mixed dye using a first mathematical model and for practicality in the real dyeing process, the B/T, the on-site dyeing, etc., may be converted into predicted dyeing absorbance spectra using a second mathematical model, and a mixing ratio of the monochromatic dyes may be corrected to reduce a color deviation by matching the absorbance spectra with the color requested by the customer's order.

That is, through the present embodiment, it is possible to implement the dyeing absorbance spectra by setting arbitrary concentrations of monochromatic dyes of various colors used at the site, and predict the dyeing absorbance spectra of the mixed dye by mixing (adjustable) the monochromatic dyes. According to the present embodiment, the mixing ratio of the monochromatic dyes may be corrected by comparing the absorbance converted from the color reflectance data requested by a buyer's order with the predicted dyeing absorbance spectra, and the monochromatic dyes may be replaced with other similar monochromatic dyes in consideration of the costs of the monochromatic dyes, the dyeing method, the dye fastness, and matching with the requested color, etc.

In this way, when the correction of the predicted dye mixing ratio and the replacement of the monochromatic dyes are performed based on the result of comparing the second spectra with the third spectra, the processor 30 may repeat the process of re-predicting the second spectra and comparing the re-predicted second spectra with the third spectra to reduce the color deviation (S70).

In this way, the dyeing process is largely performed in the following order: B/T; first on-site dyeing; second on-site dyeing; and post-processing. First, B/T is performed according to the color requested by the buyer's order and on-site dyeing is performed through scale-up. However, since the amounts of fabric and dye compared to that in the B/T varies by about 200,000 times, a correction rate of the dye mixing ratio is high (40 to 60%).

Therefore, it may be possible to match with the requested color by implementing the dyeing absorbance spectra using the mathematical models according to the present embodiment.

Further, as shown in FIG. 9, by converting reflectance data obtained by colorimetric dyeing results according to the dyeing method at each stage of the dyeing process into absorbance data, it is possible to predict the absorbance spectra of B/T, on-site dyeing, and post-processing results compared to the mixed dye used for dyeing in a random dyeing method.

Therefore, in the present embodiment, since changes in the absorbance spectra can also be checked depending on the amount and type of fabric, dye, water, and other additives used in each process stage, it is possible to predict the quality of the dyed materials in the overall dyeing process and the quality of a final dyed material.

As described above, according to the dyeing absorbance spectra prediction apparatus and method for the mixed dye according to the embodiments of the present invention, the present embodiment may provide a method in which, by calculating a dye mixing ratio of a requested color using a dye absorbance graph based on CCM reflectance, then predicting dyeing absorbance spectra dyed on real fabric or medium, and then comparing colorimetric reflectance data of the requested color with a result of converting the colorimetric reflectance data into absorbance data, it is possible to correct the dye mixing ratio of the requested color and replace the dye, and not only can the number of dye mixing ratio correction repetitions, cost, labor, and energy be reduced by reducing a color deviation ΔE, but also workers with less experience can more easily reproduce the requested color.

According to one aspect of the present invention, in the present invention, by calculating a dye mixing ratio of a requested color using a dye absorbance graph based on CCM reflectance, then predicting dyeing absorbance spectra dyed on real fabric or medium, and then comparing colorimetric reflectance data of the requested color with a result of converting the colorimetric reflectance data into absorbance data, it is possible to correct the dye mixing ratio of the requested color and replace the dye, and not only can the number of dye mixing ratio correction repetitions, cost, labor, and energy be reduced by reducing a color deviation ΔE, but also workers with less experience can more easily reproduce the requested color.

The present invention can implement the predicted dyeing absorbance (dyed A) on real fabric compared to an amount of dye used in a dye bath for practicality of dye mixing ratio at laboratory level and on the site to provide practicality in B/T and on-site dyeing.

In the present invention, it is possible to predict a color on the basis of absorbance for results at each process stage in a random dyeing method, and predict changes in color (changes in absorbance spectra) depending on the amount and type of fabric, dye, water, and other additives used, and thus it is possible to provide a final dyed product with a small color deviation (ΔE) from the requested color and to predict its quality.

While the present invention has been described with reference to embodiments illustrated in the accompanying drawings, the embodiments should be considered in a descriptive sense only, and it should be understood by those skilled in the art that various alterations and other equivalent embodiments may be made.

Therefore, the scope of the present invention should be defined by only the following claims.

What is claimed is:

1. A dyeing absorbance spectra prediction apparatus for a mixed dye, comprising:
an input module configured to receive a customer's order for dyeing and colorimetric reflectance data of a dyeing result;
a database configured to store absorbance data for each concentration for monochromatic dyes and dyeing absorbance data; and
a processor operatively coupled to the input module and the database,
wherein the processor generates the absorbance data for each concentration on the basis of reflectance data for each concentration for the monochromatic dyes, generates the dyeing absorbance data according to concentration of each dye on the basis of absorbance of a dye bath before and after dyeing of the monochromatic dyes, then predicts a dye mixing ratio for the mixed dye corresponding to a computer color matching (CCM) value of the customer's order and absorbance to predict first spectra, predicts second spectra of the dyeing absorbance with respect to the first spectra, then converts the colorimetric reflectance data of the customer's order into absorbance data to implement third spectra, compares the second spectra with the third spectra, and outputs a comparison result.

2. The dyeing absorbance spectra prediction apparatus of claim 1, wherein, when correction of the dye mixing ratio predicted based on the comparison result obtained by comparing the second spectra with the third spectra and replacement of the monochromatic dye are performed, the processor re-predicts the second spectra and compares the re-predicted second spectra with the third spectra.

3. The dyeing absorbance spectra prediction apparatus of claim 1, wherein the processor calculates an absorption rate (or absorbance) for each of the monochromatic dyes at each concentration from reflectance described in a QuickTime extension (QTX) file, which is a CCM colorimetry result for each of the monochromatic dyes at each concentration used in a real dyeing factory, to generate the absorbance data for each concentration in a wavelength range corresponding to visible light.

4. The dyeing absorbance spectra prediction apparatus of claim 1, wherein the processor checks values of color coordinates X, Y, and Z in the QTX file of the customer's order with a CCM system, selects the monochromatic dyes that are held by a dyeing factory and used for yarn production, and then predicts the dye mixing ratio for the mixed dye by calculating a deviation of the values of the color coordinates X, Y, and Z, which is basic data, and performing a simulation.

5. The dyeing absorbance spectra prediction apparatus of claim 1, wherein the processor generates a first mathematical model for each monochromatic dye by combining absorbance prediction functions at each wavelength for a monochromatic dye, a wavelength range, and a concentration that are set by a worker in a dyeing factory through regression analysis, and implements the absorbance data for each concentration for the monochromatic dyes through the first mathematical model.

6. The dyeing absorbance spectra prediction apparatus of claim 5, wherein the processor performs quantitative analysis to check a change in value of each of the color coordinates X, Y, and Z according to a change in dye concentration for each monochromatic dye using values of color coordinates X, Y, and Z in a standard light source of a CCM colorimetric QTX file that is set by the worker, combines functions, fx, fy, and fz, in which the values of color coordinates X, Y, and Z for each monochromatic dye according to an arbitrary concentration are allowed to be predicted through regression analysis of the changes in the values of color coordinates X, Y, and Z, and generates the first mathematical model through which a color of a dyeing result corresponding to the standard light source and a concentration of the monochromatic dye that are set by the worker in the dyeing factory are allowed to be predicted.

7. The dyeing absorbance spectra prediction apparatus of claim 1, wherein the processor generates a second mathematical model for each monochromatic dye by combining dyeing absorbance prediction functions in a set wavelength range of the monochromatic dye that is set by a worker in a dyeing factory, and predicts the second spectra of dyeing absorbance with respect to the first spectra through the second mathematical model.

8. The dyeing absorbance spectra prediction apparatus of claim 7, wherein the processor calculates a predicted dyeing absorbance for each monochromatic dye on the basis of the dyeing absorbance data according to the concentration of each dye, and performs quantitative analysis and regression analysis on pre-dyeing absorbance data and the predicted dyeing absorbance data to generate the second mathematical model that is allowed to implement absorbance in the set wavelength range.

9. A dyeing absorbance spectra prediction method for a mixed dye, comprising:

generating, by a processor, absorbance data for each concentration on the basis of reflectance data for each concentration for monochromatic dyes;

generating, by the processor, dyeing absorbance data according to concentration of each dye on the basis of absorbance of a dye bath before and after dyeing of the monochromatic dyes;

predicting, by the processor, a dye mixing ratio for the mixed dye corresponding to a computer color matching (CCM) value of a customer's order and the absorbance and predicting first spectra;

predicting, by the processor, second spectra of dyeing absorbance with respect to the first spectra;

converting, by the processor, colorimetric reflectance data of the customer's order into absorbance data and implementing third spectra; and comparing, by the processor, the second spectra with the third spectra and outputting a comparison result.

10. The dyeing absorbance spectra prediction method of claim 9, further comprising, when correction of the dye mixing ratio predicted based on the comparison result obtained by comparing the second spectra with the third spectra and replacement of the monochromatic dye are performed, re-predicting, by the processor, the second spectra and comparing the re-predicted second spectra with the third spectra.

11. The dyeing absorbance spectra prediction method of claim 9, wherein, in the generating of the absorbance data for each concentration, the processor calculates an absorption rate (or absorbance) for each of the monochromatic dyes at each concentration from reflectance described in a QuickTime extension (QTX) file, which is a CCM colorimetry result for each of the monochromatic dyes at each concentration used in a real dyeing factory, to generate absorbance data for each concentration in a wavelength range corresponding to visible light.

12. The dyeing absorbance spectra prediction method of claim 9, wherein, in the predicting of the first spectra, the processor checks values of color coordinates X, Y, and Z in the QTX file of the customer's order with a CCM system, selects the monochromatic dyes that are held by a dyeing factory and used for yarn production, and then predicts the dye mixing ratio for the mixed dye by calculating a deviation of the values of the color coordinates X, Y, and Z, which is basic data, and performing a simulation.

13. The dyeing absorbance spectra prediction method of claim 9, wherein, in the predicting of the first spectra, the processor generates a first mathematical model for each monochromatic dye by combining absorbance prediction functions at each wavelength for a monochromatic dye, a wavelength range, and a concentration that are set by a worker in a dyeing factory through regression analysis, and implements the absorbance data for each concentration for the monochromatic dyes through the first mathematical model.

14. The dyeing absorbance spectra prediction method of claim 13, wherein, in the predicting of the first spectra, the processor performs quantitative analysis to check a change in value of each of the color coordinates X, Y, and Z according to a change in dye concentration for each monochromatic dye using values of color coordinates X, Y, and Z in a standard light source of a CCM colorimetric QTX file that is set by the worker, combines functions, fx, fy, and fz, in which the values of color coordinates X, Y, and Z for each monochromatic dye according to an arbitrary concentration are allowed to be predicted through regression analysis of the changes in the values of color coordinates X, Y, and Z, and generates the first mathematical model through which a color of a dyeing result corresponding to the standard light source and a concentration of the monochromatic dye that are set by the worker in the dyeing factory are allowed to be predicted.

15. The dyeing absorbance spectra prediction method of claim 9, wherein, in the predicting of the second spectra, the processor generates a second mathematical model for each monochromatic dye by combining dyeing absorbance prediction functions in a set wavelength range of the monochromatic dye that is set by a worker in a dyeing factory, and predicts the second spectra of dyeing absorbance with respect to the first spectra through the second mathematical model.

16. The dyeing absorbance spectra prediction method of claim 15, wherein, in the predicting of the second spectra, the processor calculates a predicted dyeing absorbance for each monochromatic dye on the basis of the dyeing absorbance data according to the concentration of each dye, and performs quantitative analysis and regression analysis on pre-dyeing absorbance data and the predicted dyeing absorbance data to generate the second mathematical model that is allowed to implement absorbance in the set wavelength range.

* * * * *